(No Model.) 2 Sheets—Sheet 1.
H. GROSWITH.
ELECTRIC MOTOR.
No. 412,177. Patented Oct. 1, 1889.
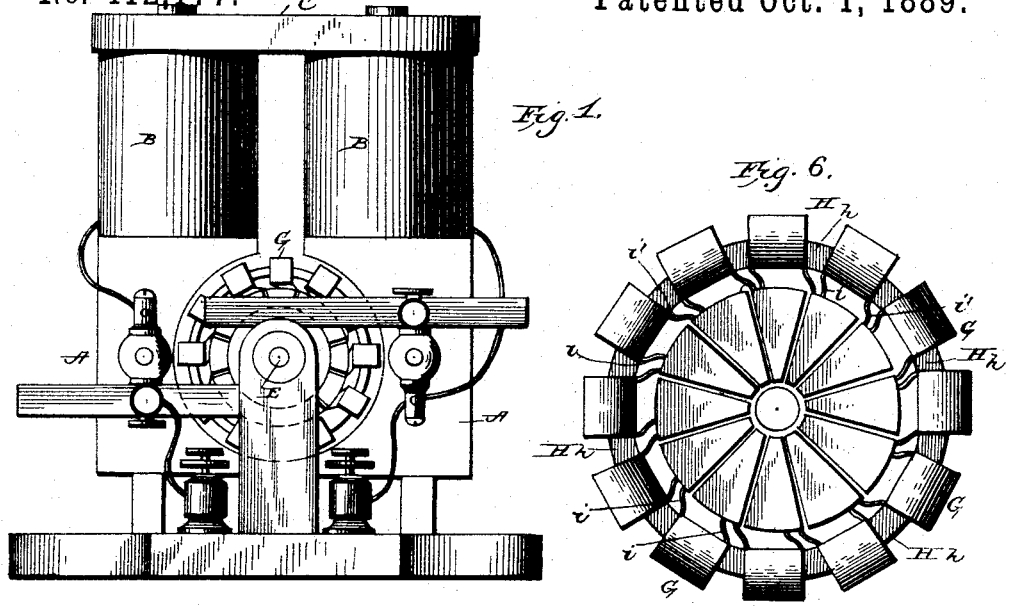
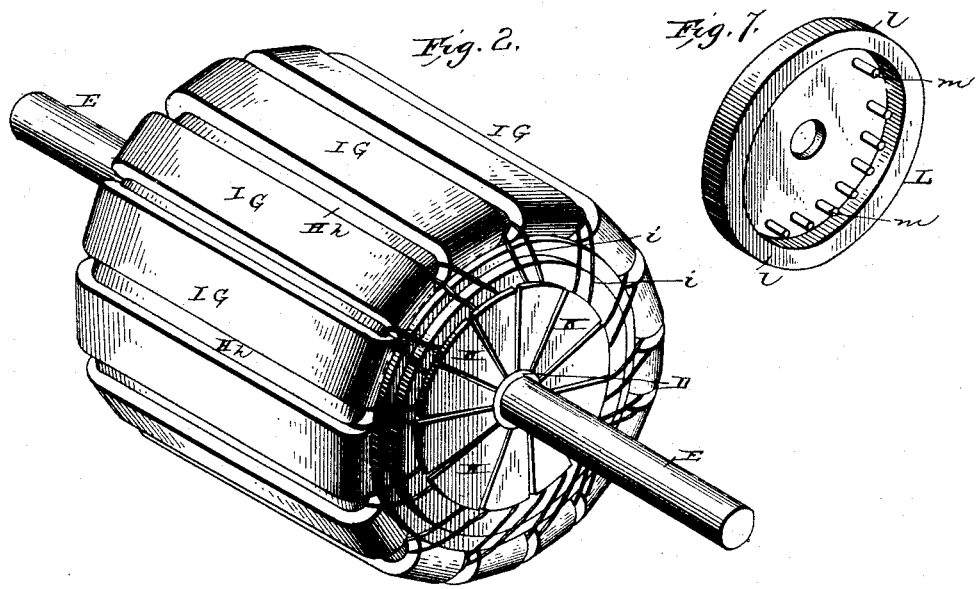
WITNESSES:
INVENTOR:

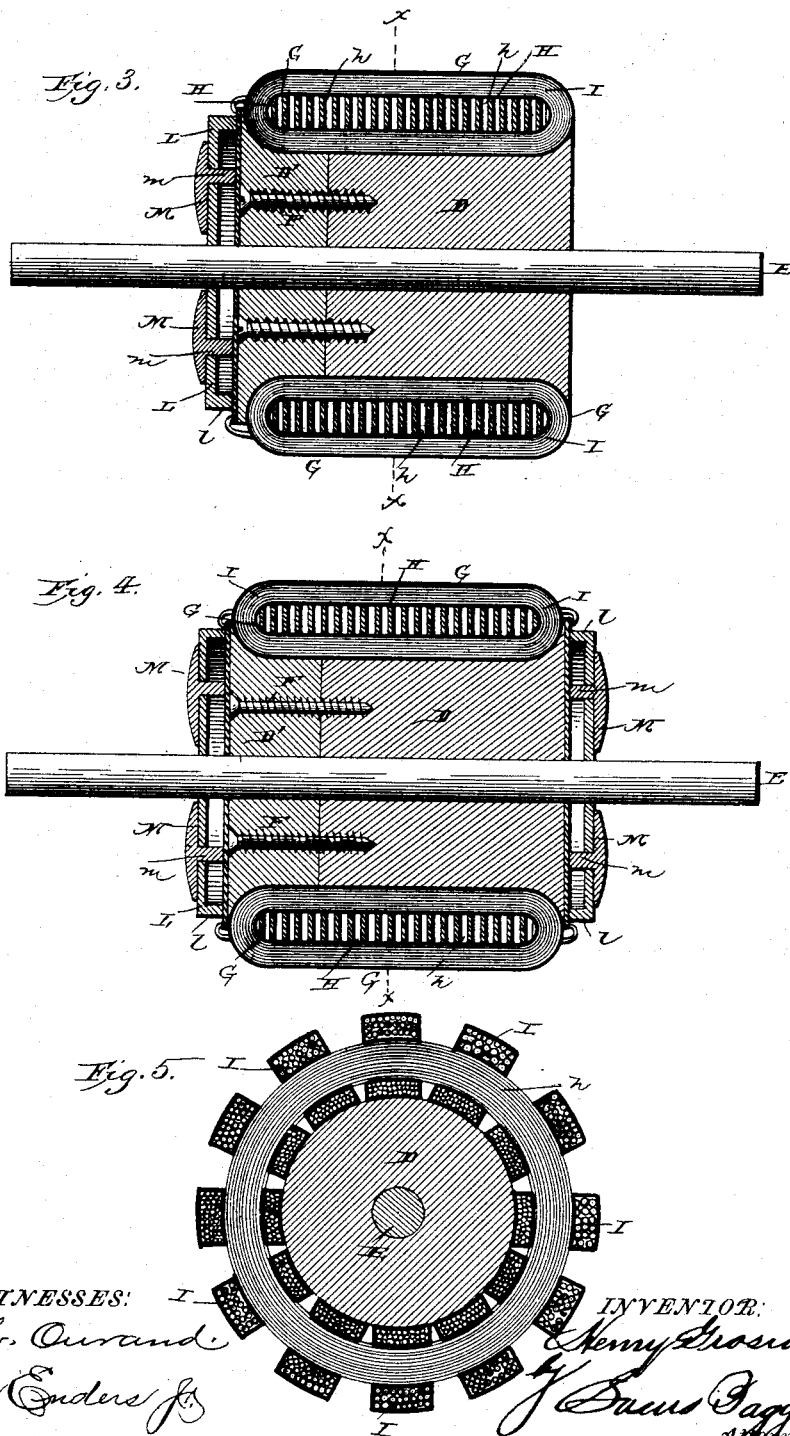

UNITED STATES PATENT OFFICE.

HENRY GROSWITH, OF PHILADELPHIA, PENNSYLVANIA, ASSIGNOR OF THREE-FOURTHS TO CHARLES W. KENNEDY AND RANSOM F. RANKIN, OF SAME PLACE.

ELECTRIC MOTOR.

SPECIFICATION forming part of Letters Patent No. 412,177, dated October 1, 1889.

Application filed July 30, 1889. Serial No. 319,188. (No model.)

*To all whom it may concern:*

Be it known that I, HENRY GROSWITH, a citizen of the United States, and a resident of Philadelphia, in the county of Philadelphia and State of Pennsylvania, have invented certain new and useful Improvements in Electric Motors; and I do hereby declare that the following is a full, clear, and exact description of the invention, which will enable others skilled in the art to which it appertains to make and use the same, reference being had to the accompanying drawings, which form a part of this specification, and in which—

Figure 1 is a side elevation of my improved electric motor. Fig. 2 is a perspective view of the revolving hub with its armatures. Fig. 3 is a sectional view through the axis of said hub with its armatures and other appurtenances, showing the same as when constructed for a "single-header," or with contact-plates and commutators on one side of the machine only. Fig. 4 is a similar view of the same parts as arranged when the machine is to be run as a "double-header," or with contact-plates on both sides of the machine. Fig. 5 is a transverse sectional view on line $x\, x$ in Figs. 3 and 4. Fig. 6 is a side view of the revolving armature with the box or bearing for the contact-plates removed, and Fig. 7 is a perspective detail view of the inner side (facing the armature) of said box or bearing.

Like letters of reference denote corresponding parts in all the figures.

My invention relates to electric motors of the "Gramme" type, in which the power is furnished by a cylindrical armature revolving in a vertical plane between the poles of a fixed field; and it consists in the improved construction and combination of parts of the armature and commutators of an electric motor of that class, as will be hereinafter more fully set forth.

My improved motor is constructed with the usual concaved polar extremities A A, of cast-iron or other suitable metal, and of sufficient size and weight for the contemplated horse-power. These polar pieces are provided on top with the usual coiled-wire fields B B, which are connected by the magnet or cross-plate C in the usual and well-understood manner, these parts of the machine forming no part of my invention, but being common in a more or less modified form to all electric motors of that type.

The revolving armature, which, with its adjuncts constitutes my improvement, is built as follows: I first construct by turning in a lathe a wooden cylindrical hub or core D of the proper dimensions, and adapted to be secured firmly upon a central shaft E. This core D is made in two parts or sections D and D', both of which are bored through centrally to receive the shaft E, upon which they are suitably fastened, the part or section D' being fastened endwise upon the other part or section D by means of ordinary wood-screws F, the heads of which are countersunk in the outer face of the part D', as shown in Figs. 3 and 4.

The complete wooden hub D D' is concaved or recessed annularly to form a seat for the coils or convolutions I of insulated wire, each of which is covered by rings or bands G of suitable insulating material. These insulated wire rings or coils are disposed equidistant from one another around and upon the core or hub D D', from which, however, they are separated by the inner sides of the insulating-bands G, which rest in the annular concave recess or seat in the hub.

The series of insulated coils I is held together and fastened upon the hub by means of a cylindrical core, forming a band, which is built up of a series of soft-iron rings H, alternating with rings $h$, of paper or other suitable insulating material, thus forming, so to speak, a compound annular core H $h$ for the series of coils, which core is covered with insulating material and forms an insulated band around the wooden hub, clamping the inner sides of the coils, for which it forms the core, against the hub, as will be seen more readily by reference to Fig. 5 of the drawings.

By constructing the wooden hub or core in two parts, as described, it will be observed that the core-band H $h$, with the wire coils disposed upon and around it, may readily be placed upon the part D, after which the other part or section D' is placed in position and fastened by means of the screws F. The two parts D and D' being thus fastened together, they form a firm seat or support for the concentric core H $h$ and coils or bobbins I.

Upon one (or both) heads of the hub is fastened a series of equidistant radial metal plates or sectors K, corresponding in number to the number of insulated wire coils. The terminal points $i$ and $i'$ of the wire constituting each armature-coil are connected to these plates alternately—i. e., the bottom terminal $i'$ of one of the coils being connected to one of these plates or sectors, the other or upper terminal $i$ of the same coil is connected to the next adjacent sector-plate, to which again is connected the bottom terminal $i'$ of the coil next in order, and so on through the entire series of plates and coils, thus completing the electric circuit in the armature through all the coils composing it.

Fastened upon one or both heads or ends of the wooden hub is a shallow cylindrical wooden box L, forming a bearing for the radially-disposed contact or commutator plates M, which are of copper or other suitable metal. Each of these plates has at its inner end a right-angled elbow or projection $m$, which is inserted through and fits into a hole bored through the head of box L. The object of this elbow or projection $m$ is twofold, viz: First, it forms a means of attachment for its appropriate plate M upon the box or bearing, and, second, it forms a contact between said plates M and the corresponding or registering plates or sectors K on the hub, the projections $m$ being of sufficient length to press against said plates with their inner ends, which are covered and protected by the rim $l$ of the box or bearing L. The plates M and K should, of course, be properly insulated from the heads or bearings into which they are inserted.

If it is desired to construct the machine as a double-header, and thereby double its power or capacity, the fields, with the polar pieces, should, of course, be made of sufficient size for the increased capacity of potential required. I also double the number of coils on the armature and duplicate the plates M and K with their attachments—that is to say, instead of providing only one side or head of the revolving armature with these appurtenances, (using a plain wooden disk only on the other side,) as in Fig. 3, I provide both sides with these attachments, as in Fig. 4, connecting the radial sector-plates K on opposite sides alternately to alternating coils on the armature. In other words, the termini of half the number of coils alternating with one another are connected, in the manner described, to the insulated conduit-plates or sectors K on one side of the machine, while the termini of the remaining half (alternating with the others) are similarly connected to the conduit-plates K on the opposite side, thereby providing the armature with contact or commutator plates on both sides, each side being of course equipped with the usual fixed commutator-brushes, instead of having these on one side only, as in a single-header machine.

By arranging the commutator-plates M radially in a vertical plane the friction between them and the brushes is reduced to a minimum, resulting in reducing the wear both of brushes and contact-plates. The box L may be removed in a moment of time simply by loosening the screws by which it is fastened upon the sides of the wooden core whenever it is desired to repair or replace their respective plates, and by riveting the elbows $m$ of the contact or commutator plates on the inside of the box or bearing L they will be held firmly in their appropriate position relative to the brushes.

From the foregoing description, taken in connection with the drawings, it will be observed that this motor may be constructed at a comparatively small expense, and also that, simply by unscrewing screws F and removing the hub-section D' the coils and the core-band connecting the same may readily be removed, whenever desired, for repair or for other purposes.

Having thus described my invention, I claim and desire to secure by Letters Patent of the United States—

1. The combination of the armature proper constructed substantially as described, the removable disk or plate provided with radial metallic conduit-plates or sectors adapted to connect the termini of the wire coils in the manner described, and the removable box or bearing carrying the radial contact or commutator plates arranged in a vertical plane and connected at their inner ends to the corresponding sector-plates, substantially as and for the purpose set forth.

2. The combination, in an electric motor, of an armature constructed substantially as described, the radial connecting-plates or sectors, and the radial commutator-plates arranged in a vertical plane and adapted to bear with their outer sides or faces against commutator-brushes adapted to press against them at right angles, or in a direction parallel to the axis of the motor, substantially as and for the purpose shown and set forth.

In testimony that I claim the foregoing as my own I have hereunto affixed my signature in presence of two witnesses.

HENRY GROSWITH.

Witnesses:
C. H. COCHRAN,
R. F. RANKIN.